G. W. COEN.
VALVE.
APPLICATION FILED JAN. 26, 1916.

1,208,292.

Patented Dec. 12, 1916.

WITNESSES:
B. W. Doolin
L. J. Forde

INVENTOR
Garnet W. Coen.
BY Strong & Townsend
ATTORNEYS

UNITED STATES PATENT OFFICE.

GARNET W. COEN, OF SAN FRANCISCO, CALIFORNIA.

VALVE.

1,208,292. Specification of Letters Patent. Patented Dec. 12, 1916.

Application filed January 26, 1916. Serial No. 74,356.

*To all whom it may concern:*

Be it known that I, GARNET W. COEN, a citizen of the United States, residing in the city and the county of San Francisco and State of California, have invented new and useful Improvements in Valves, of which the following is a specification.

This invention relates to an automatic shut-off valve.

Many accidents resulting in fires which have caused great loss of property and oftentimes life have been recorded which were the direct result of the breaking of fuel oil pipes, burners, fittings or connections in a fuel oil burning system; such accidents have taken place both on steamers and on shore. Accidents are also caused at different times by a temporary stoppage of the oil pressure pumps, caused by gas or air formation which is suddenly relieved. This temporary shut down of the pressure in the service or pipe line often reduces the pressure sufficiently to entirely extinguish the burners and when the pressure is again applied it causes a flooding of the furnace with hot oil which creates a highly dangerous condition.

The object of the present invention is to provide a valve for use on service pipes through which gas or liquid flows under pressure and which is so constructed that it will automatically shut off the supply to the service line in case of a drop in pressure due to breakage in the line, fracture of the fittings, temporary clogging or other causes.

Another object of the invention is to provide a valve of the character described which is so constructed that it is possible to set the valve to automatically close the moment the pressure in the line is reduced below any predetermined pressure and furthermore to provide means for maintaining the valve closed until it is manually opened.

A further object is to provide means for diverting or returning the oil to the feed pump or elsewhere, when the valve automatically closes.

Still another object is to provide means whereby the valve may be opened by hand and made inoperative if desired, regardless of the pressure in the service pipe.

The invention consists of the parts and the construction and combination of parts, as hereinafter more fully described and claimed, having reference to the accompanying drawings, in which—

Figure 1:
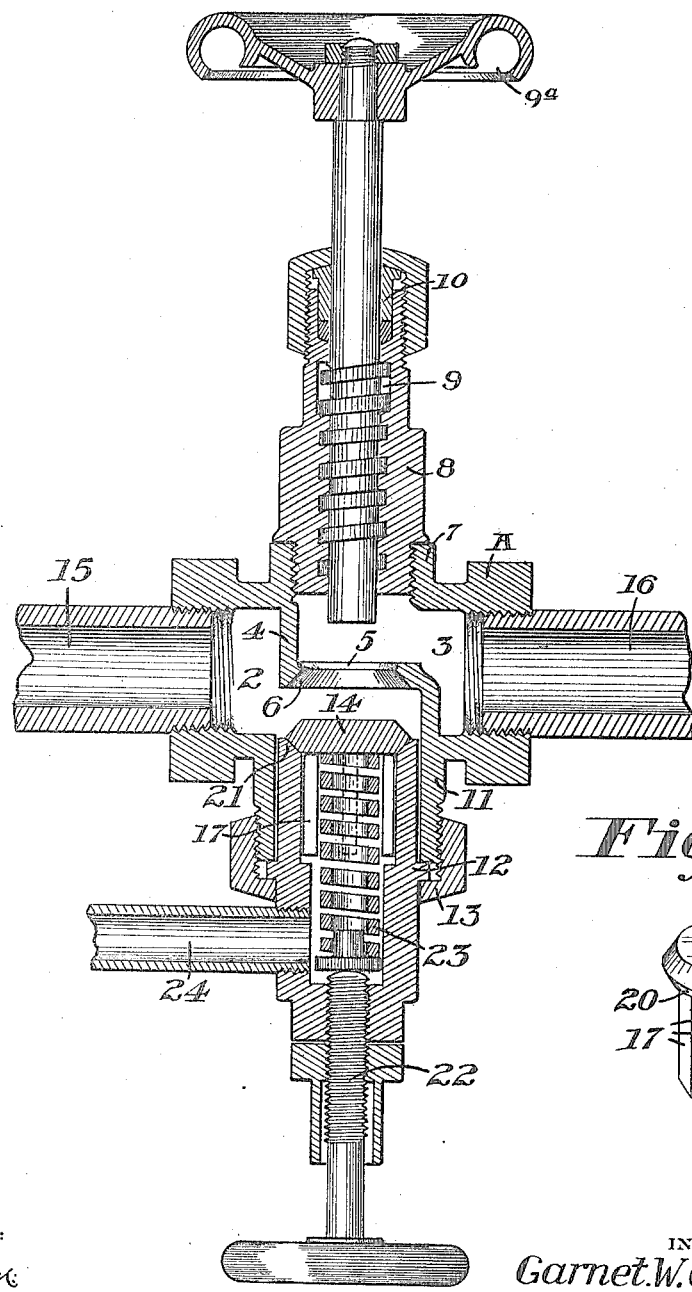
Figure 2:
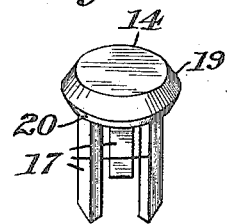

Figure 1 is a central, vertical section through the valve showing its connection with a supply pipe and the service line. Fig. 2 is a perspective view of the automatically actuated valve which shuts off the flow.

Referring to the drawings in detail, A indicates the main valve casing provided with an inlet opening 2, an outlet opening 3 and a central partition member 4, in which is formed a connecting passage 5 and a valve seat 6. Formed on the upper side of the casing A in alinement with the connecting passage 5 is an internally threaded extension 7, provided for the purpose of receiving a casing extension 8 which carries a threaded valve stem 9 and a stuffing box 10. Formed on the lower side of the main valve casing A in alinement with the connecting passage 5 is an externally threaded extension 11 through which may be inserted a cup extension 12, which is secured in position by means of a screw cap 13.

Slidably mounted in the inner end of the extension 12 is a valve 14 which is adapted to close the connecting passage 5 between the supply pipe 15 and the service pipe 16. The valve 14 is provided with a plurality of downwardly extending guide lugs 17 and is furthermore formed with two tapering surfaces or faces 19 and 20. The face 19 coöperates with the valve seat 6 and the face 20 with a valve seat 21, formed on the inner end of the casing extension 12. Mounted in the lower end of the extension 12 is an adjusting screw 22 and interposed between said screw and valve 14 is a coil-spring 23 provided for the purpose of normally projecting the valve 14 against the seat 6, to close the passage 5 as previously described.

The extension 12 is hollow to receive the spring 23, to form a guide for the lug 17 and also to permit a flow of oil through pipe 15, through the hollow interior of the extension 12 and a return pipe 24 connected with said extension, and the feed pump or elsewhere.

The operation of the valve will be as follows: With the pipe connected with a feed pump or any other suitable source of oil supply and the pipe 16 connected with one or more oil burners supplied with oil through pipes 15 and 16 under a predetermined pressure, for instance 80 lbs., when first turning on the oil it is first necessary to turn the stem 9 by means of a handle 9ᵃ until it passes through the passage 5 sufficiently far to force the valve 14 against its lower valve seat 21. The oil under 80 lbs. pressure may now be turned on and will consequently supply and operate the burners. The stem 9 may now be turned back to assume the position shown in Fig. 1, as the pressure in the pipe line will be sufficient to hold the valve 14 on its seat 21 against the pressure of the spring 23; the tension of which may be adjusted by means of the adjusting screw 22 to close at any predetermined pressure. For instance, it may be desired to close the valve the moment the pressure drops to 50 lbs. Any reduction in pressure caused by a temporary stoppage of the feed pump, clogging of the pipe 15 or a fracture or breaking of any fittings or connections in the line which causes a temporary or permanent drop in pressure below 50 lbs. will permit the spring 23 to project the valve 14 against the valve seat 6 and will close the connecting passage 5 between pipes 15 and 16. The oil supplied to the service line is thus automatically cut off the moment the oil pressure becomes reduced below a predetermined pressure and it will furthermore remain shut off until the valve 14 is manually opened by means of the threaded stem 9. Many accidents, such as flooding of the furnace, etc., are thus avoided.

The provision of the return pipe 24 is one of the important features of the present invention, as it permits a return flow of the oil delivered by pipe 15 when the passage 5 is closed, thus preventing bursting of the pipe before the pump is shut down. It is also of further importance as it permits drainage or return of any leakage which might take place between the valve 14 and seat 21. The provision of the spring 23 between valve 14 and the adjusting screw 22 is also an important feature as it permits of adjustment which makes it possible for the valve to close the moment the pressure in the line is reduced below any predetermined pressure.

A valve constructed as here shown may also be used as an ordinary valve by screwing down the threaded stem 9 and retaining the valve 14 against its lower seat 21. Its automatic function is, however, not possible under such conditions. But the flow of oil through the valve may be regulated to a greater or less extent by raising or lowering the stem 9 to move the valve 14 to or away from its seat 6.

A valve constructed as here shown is simple, substantial in construction, may be cheaply manufactured and may be used as an automatic shut-off valve as described or as an ordinary valve if desired. Its use prevents accidents of the character described, as it positively prevents flooding of the furnace box.

The materials and finish of the several parts of the device may otherwise be such as the judgment and experience of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. The combination with a valve casing having an inlet opening connected with a source of fluid supply under pressure and an outlet opening connected with a service line, of a pair of passages in the valve casing having valve seats formed therein, one of said passages forming communication between the source of supply and the service line, and the other passage forming communication between the source of supply and a return, a valve interposed between the valve seats adapted to be normally actuated by the fluid under pressure to close the passage between the source of supply and the return, mechanical means within the casing for automatically projecting the valve against the opposite seat to shut off flow of liquid through the service line the moment the fluid pressure drops below a predetermined pressure, and means for positively retaining the valve on its seat to prevent the automatic operation described.

2. The combination with a valve casing having an inlet opening connected with a source of fluid supply under pressure and an outlet opening connected with a service line, of a pair of passages in the valve casing having valve seats formed therein, one of said passages forming communication between the source of supply and the service line, and the other passage forming communication between the source of supply and a return, a valve interposed between the valve seats adapted to be normally actuated by the fluid under pressure to close the passage between the source of supply and the return, means for automatically projecting the valve against the opposite seat to shut off flow of liquid through the service line the moment the fluid pressure drops below a predetermined pressure, and means for positively retaining the valve on its seat to prevent the automatic operation described, said means comprising a threaded valve stem adapted to be screwed down into engagement with the valve.

3. The combination with a valve casing having an inlet opening connected with a source of fluid supply under pressure and an outlet opening connected with a service line, of a pair of passages in the valve casing having valve seats formed therein, one of said passages forming communication between the source of supply and the service line, and the other passage forming communication between the source of supply and a return, a valve interposed between the valve seats adapted to be normally actuated by the fluid under pressure to close the passage between the source of supply and the return, means for automatically projecting the valve against the opposite seat to shut off flow of liquid through the service line the moment the fluid pressure drops below a predetermined pressure, said means comprising a spring engageable with the valve, means for increasing the tension of the spring to permit the valve to automatically close under varying pressures, and means for positively retaining the valve on its seat to prevent the automatic operation described.

4. In combination, a valve casing having an inlet opening connected with a source of fluid supply under pressure and an outlet opening connected with a service line, of a passage in said casing between said source of supply and said service line, a valve seat in said passage, said casing being provided with an opening, a cup extension detachably fitting in said opening, said extension provided with a valve seat, a valve interposed between said seats normally actuated by the fluid under pressure to hold the valve on said cup extension seat to close the inner end of said cup extension, means for automatically projecting the valve against said passage seat to shut off the flow of liquid through the service line the moment the fluid pressure drops below a predetermined degree, and to establish communication between said source of supply and said cup, and a return pipe communicating with said cup extension.

5. In combination, a valve casing having an inlet opening connected with a source of fluid supply under pressure and an outlet opening connected with a service line, of a passage in said casing between said source of supply and said service line, a valve seat in said passage, said casing provided with a hollow extension, a cup extension fitting within said hollow extension, a nut engaging said cup extension and screwing on the end of said hollow extension to hold said cup extension within said hollow extension, said cup extension provided with a valve seat, a valve interposed between said seats normally actuated by the fluid under pressure to hold the valve on said cup extension seat to close the inner end of said cup extension, means for automatically projecting the valve against said passage seat to shut off the flow of liquid through the service line the moment the fluid pressure drops below a predetermined degree and to establish communication between said source of supply and said cup, and a return pipe communicating with said cup.

6. In combination, a valve casing having an inlet opening connected with a source of fluid supply under pressure, and an outlet opening connected with a service line, of a passage in said casing between said source of supply and said service line, a valve in said passage, said casing provided with an opening, a cup extension detachably fitting within said opening, said extension provided with a valve seat, a valve interposed between said seats normally actuated by the fluid under pressure to hold the valve on said cup extension seat to close the inner end of said cup extension, a spring within said cup extension for automatically projecting the valve against said passage seat to shut off the flow of liquid through said service line the moment the fluid pressure drops below a predetermined degree, and to establish communication between said source of supply and said cup, and a return pipe leading from said cup extension.

7. In combination, a valve casing having an inlet opening connected with a source of fluid supply under pressure, and an outlet opening connected with a service line, of a passage in said casing between said source of supply and said service line, a valve in said passage, said casing provided with an opening, a cup extension detachably fitting within said opening, said extension provided with a valve seat, a valve interposed between said seats normally actuated by the fluid under pressure to hold the valve on said cup extension seat to close the inner end of said cup extension, a spring within said cup extension for automatically projecting the valve against said passage seat to shut off the flow of liquid through said service line the moment the fluid pressure drops below a predetermined degree, and to establish communication between said source of supply and said cup, and a return pipe leading from said cup extension, and means for adjusting the tension of said spring.

8. In combination, a valve casing having an inlet opening connected with a source of fluid supply under pressure, and an outlet opening connected with a service line, of a passage in said casing between said source of supply and said service line, a valve in said passage, said casing provided with an opening, a cup extension detachably fitting within said opening, said extension provided with a valve seat, a valve interposed between said seats normally actuated by the fluid under pressure to hold the valve on said cup extension seat to close the inner end of said cup extension, a spring within said cup extension for automatically projecting the valve against said passage seat to shut off the flow of liquid through said service line the moment the fluid pressure drops below a predetermined degree, and to establish communication between said source of supply and said cup, a return pipe leading from said cup extension, and a screw extending into said cup extension for adjusting the tension of said spring.

In testimony whereof I have hereunto set my hand in the presence of two subscribing witnesses.

GARNET W. COEN.

Witnesses:
  JOHN H. HERRING,
  W. W. HEALEY.